United States Patent [19]

Marchal

[11] Patent Number: 4,757,839

[45] Date of Patent: Jul. 19, 1988

[54] HIGH PRESSURE RELIEF VALVE

[76] Inventor: Francis V. Marchal, 1125 McConnell Ave., Erie, Pa. 16505

[21] Appl. No.: 918,349

[22] Filed: Oct. 14, 1986

[51] Int. Cl.⁴ ............................................. F16K 17/04
[52] U.S. Cl. .................................. 137/490; 137/489.5; 137/492.5
[58] Field of Search .................. 137/489.5, 497.5, 490, 137/492, 491, 492.5; 251/282

[56] References Cited

U.S. PATENT DOCUMENTS

| | | | |
|---|---|---|---|
| 1,660,382 | 2/1928 | Hopkins | 137/491 |
| 2,375,410 | 5/1945 | Gondek | |
| 2,520,893 | 8/1950 | Stevenson | |
| 2,587,161 | 2/1952 | Huber | |
| 2,737,200 | 3/1956 | Lornitzo et al. | |
| 2,759,487 | 8/1956 | Lornitzo | 137/489.5 X |
| 3,077,898 | 2/1963 | Raymond | 137/491 |
| 4,410,005 | 10/1983 | Reys | 137/488 |
| 4,471,810 | 9/1984 | Muchow | 251/282 X |
| 4,494,726 | 1/1985 | Kumar et al. | |

Primary Examiner—Alan Cohan
Attorney, Agent, or Firm—Kent E. Baldauf

[57] ABSTRACT

A high pressure relief valve for use in fluid systems, gas or liquid with zero leakage at pressures of 25,000 psi and above. The relief valve includes a valve body having an axial bore communicating with the high pressure fluid system with at least one, and preferably four, outlet orifices formed therethrough. A small diameter pilot hole is formed in the valve body communicating with the axial bore thereof and with a pilot seating area on an exterior surface thereof. A poppet member having an internal bore is slidably fitted over the valve body to seal off the outlet orifices when in a closed position and for uncovering the orifices when in an open position. A spring biases the poppet in the closed position. A pilot plunger is slidable mounted within the internal bore of the poppet to seal-off the pilot hole of the valve body when in a closed position. A spring biases the pilot plunger in the closed position. At a predetermined fluid pressure, the pilot plunger is adapted to unseat from the pilot hole which allows the high pressure fluid to flow therethrough and to cause the plunger to move the poppet to the open position to permit the venting of the system.

14 Claims, 2 Drawing Sheets

HIGH PRESSURE RELIEF VALVE

BACKGROUND OF THE INVENTION

The present invention relates generally to high pressure relief valves and, more particularly, to pilot operated relief valves for use in fluid systems, both gas and liquid, to protect the system from excessive pressures. A relief valve is pre-set and, ideally, should open when the system pressure reaches a certain predetermined maximum value. This ideal valve then relieves a particular volume of fluid necessary to maintain the predetermined, maximum pressure level and then closes tightly at the instant the system pressure drops to a value below the maximum pre-set level. Unfortunately, in actual practice, this ideal is not always realized. Commonly used relief valves have a cracking or threshold pressure level, the pressure at which the valve begins to open, and a full flow pressure level, the pressure required to open them fully. The difference between full-flow pressure and cracking pressure levels is the pressure differential of the value, commonly referred to as the valve override. The smaller the pressure differential, or override, the greater the sensitivity of the valve. Prior relief valves generally exhibit excessive differential which causes them to open at the cracking threshold at a pressure level far below the pre-set maximum system pressure level, which, greatly diminishes the useful flow in the fluid system. Prior valves are also prone to excessive chattering which is generally caused by an instability of the internal fluid sealing elements. In addition, these prior devices also exhibit an objectionable characteristic referred to as "dead band" wherein the value closes at a pressure valve which is different than the pressure at which the valve opens. Ideally, a relief valve should exhibit a zero dead band characteristic and, thus, open and close at substantially the same fluid pressure value. In addition, many prior valves also develop leakage problems, particularly, at higher system pressures, for example, above 20,000 psi.

The present invention solves these prior problems by providing a full flow pressure relief valve, suitable for very high system fluid pressures, on the order of up to 25,000 psi or greater. The present invention provides a pressure relief valve in which the valve differential override is minimized so as to yield a valve with improved performance and sensitivity at these high fluid pressures. In addition, the dead band characteristic is substantially eliminated in the present valve.

My invention further provides a pressure relief valve which eliminates the prior problem of pilot chattering by way of an improved plunger and poppet arrangement. Further, the relief valve of my invention provides improved life in hostile environments, to virtually eliminate leakage problems due to corrosion or erosion. Should maintenance be required, the pressure relief valve of the invention still further provides a composite valve body which may be refurbished at minimal cost by merely replacing the worn components. In addition, the invention provides a poppet sealing arrangement in which fluid leakage is eliminated at the aforementioned high pressure.

SUMMARY OF THE INVENTION

These and other advantages are realized by the high pressure relief valve of the present invention in a realatively simple and effective manner. The relief valve of my invention is adapted for use in fluid systems gas or liquid, with zero leakage, at fluid system relief pressures of 25,000 psi or above. Briefly stated, the present invention provides a pressure relief valve comprising a valve body having an axial bore extending therethrough with an inlet end adapted to communicate with the high pressure fluid system and having at least one, and preferably four, transversely extending outlet orifices, communicating with the axial bore and with an exterior surface of the valve body. A small diameter pilot hole is formed in the valve body and communicates with the axial bore and with a pilot sealing area on an exterior surface thereof. A poppet member with an internal bore is slidably fitted over the portion of the valve body having the outlet orifices to seal-off the orifices when in a closed position and for uncovering the outlet orifices when in an open position. The poppet member is biased downwardly in the closed position by an adjustable, high compression spring and is moved upwardly to the open position by a pilot plunger which is slidably mounted within the internal bore of the poppet member, above the valve body. The pilot plunger carries a sealing element, preferably a spherically-shaped, sealing ball of a polyamide material, to seal-off the pilot hole of the valve body when the plunger is in a closed position. A sensitive spring element biases the plunger in the closed position and is adjustably pre-set to permit the plunger sealing ball to unseat from the pilot hole at a predetermined maximum fluid system pressure. When the sealing ball unseats, pressurized fluid, flowing through the pilot hole, rapidly forces the plunger upwardly, causing the poppet to move in a linear direction to an open position wherein the outlet orifices of the valve body are fully exposed to permit the venting of the fluid system. Due to the relatively large surface area of the plunger, the pressurized fluid generates a relatively large force on the plunger which results in an instantaneous opening of the poppet to a full-flow condition. Hence, the pressure differential between the full-flow and cracking pressures, referred to above as the override, is virtually zero in the present invention. When a sufficient volume of fluid has vented through the relief valve to cause the system pressure to decrease to the predetermined level, the pre-set, high compression spring biasing the poppet, immediately forces the poppet to move downwardly to the closed position to seal-off the outlet orifices of the valve body. A vent hole is formed in the poppet to permit the fluid trapped within the interior bore to be expelled by the pilot plunger as it rapidly descends to once again seal-off the pilot hole of the valve body. Hence, the opening and closing pressures of the valve is virtually identical, resulting in a desired dead band value of zero.

The valve body preferably includes an insertable, nozzle sleeve which is fitted within the central bore of the valve body and which carries the main outlet orifices therein. This two-part construction permits the convenient and economical replacement of the nozzle sleeve, which is susceptible to corrosion and erosion wear due to high velocity fluid impingement. In addition, the nozzle sleeve material may be different from that of the body and could be a more expensive exotic alloy, particularly suited to resist the chemical effects of a particular fluid system. For most applications, the valve components having an expected service contact with the fluid system are constructed of a high strength corrosion resistant material such as stainless steel. The valve body and poppet members are preferably enclosed by a housing which is designed to withstand the full inlet pressure of the fluid system. The housing may be fitted with lifting gear connected to the poppet permit the opening of the valve at pressure levels below the pre-determined maximum system pressure. Thus, the relief valve of the present invention is readily converted to a direct acting control valve with the addition of the aforementioned lifting gear, which may be in the form of a hand operated lever or a manually or remotely actuated pneumatic or hydraulic cylinder and piston arrangement.

BRIEF DESCRIPTION OF THE DRAWINGS

These, as well as other objects and advantages of the present invention will become more apparent when reference is made to the following detailed description taken along with the accompanying drawings, in which.

DETAILED DESCRIPTION OF THE INVENTION

Figure 1:
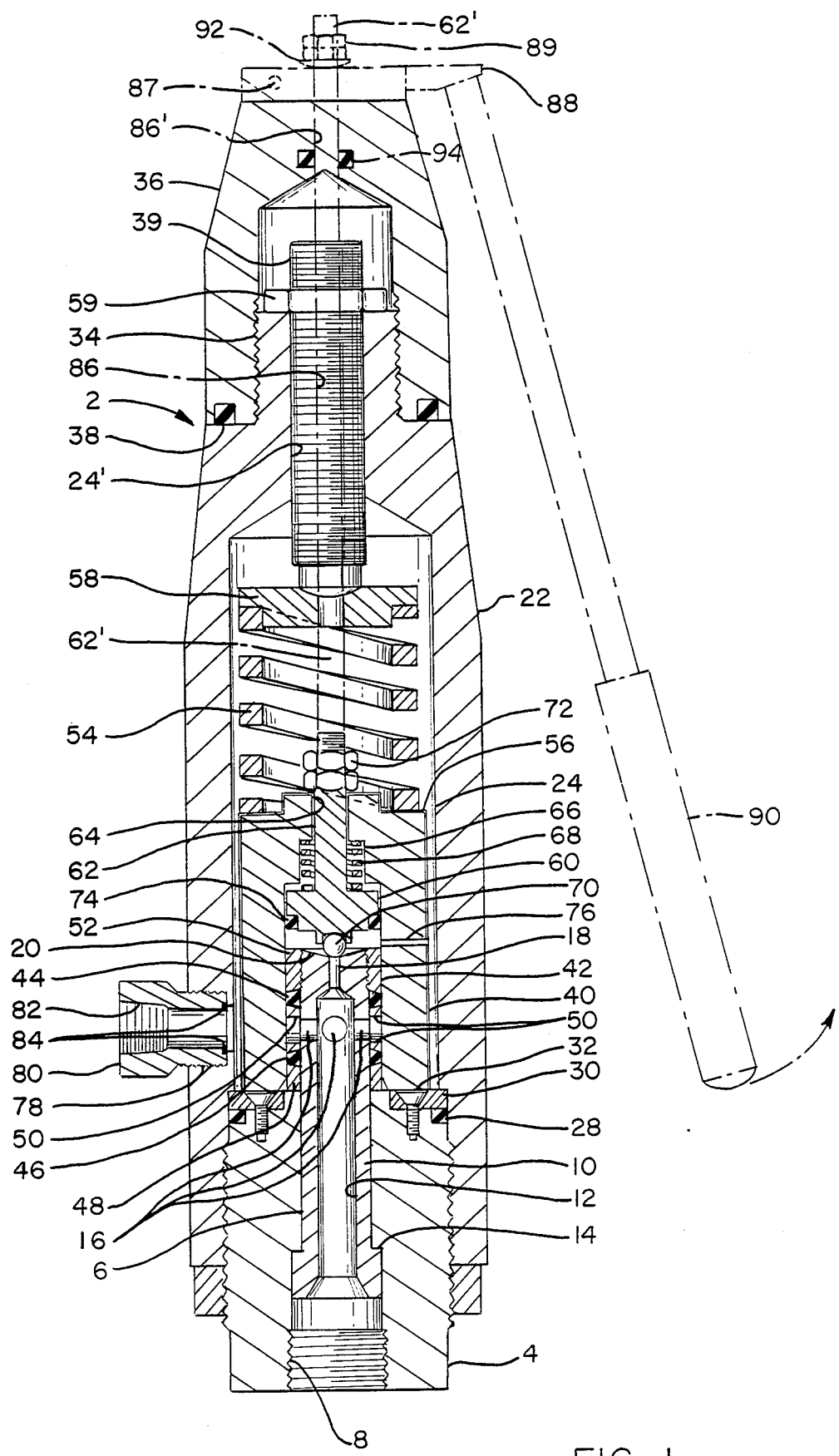
FIG. 1 is a cross-sectional, side elevation view of a relief valve constructed in accordance with the present invention shown in a closed position.

Referring now to the drawings, wherein like elements are indicated by the same reference numerals throughout the various figures, a high pressure relief valve constructed in accordance with the present invention is depicted therein and generally designated 2. The relief valve 2 is suitable for use with a variety of fluid process media, both liquid and gaseous, or mixtures thereof, at system pressures on the order of 20,000 psi to 30,000 psi.

The relief valve 2 includes a valve body member 4 which is cylindrically shaped and has an internal bore 6 formed therein. The bore 6 of the valve body has an inlet end 8 which is adapted to be placed in communication with the high pressure fluid system. Internal threads are provided around the bore at the inlet 8 to facilitate such a system connection through the use of an appropriate threaded fitting (not shown). A nozzle member 10 in the form of a cylindrically shaped element having an axial bore 12 is fixedly secured by way of an interference-type fit within the bore 6 of the valve body 4. A pair of shoulders 14 are provided, mating respectively around the bore 6 and on the outside circumference of the nozzle 10, to insure a proper dimensional seat and alignment for proper functioning of the nozzle, which will be explained in greater detail below. The aforementioned interference fit creates a pre-stressed condition between the nozzle 10 and valve body 4 which is desirable, since, upon fluid pressurization of the valve 2, the hoop stresses at the transitional wall, at the bore 6, are negated and become zero.

The nozzle member 10 has four outlet orifices 16 formed therein at 90° intervals around the circumference thereof which extend transversely therethrough relative to the axial bore 12 of the nozzle. Outlet orifices 16 communicate with the bore 12 at one end and with the exterior surface of the nozzle 10 at the other end. The diameter of each orifice 16 is sufficiently large to provide a full volumetric fluid flow rate when the relief valve 2 opens. One form of my valve has a total outlet orifice flow area of approximately 0.248 square inches. For comparison purposes, this flow area is significantly greater than known high pressure relief valves of the prior art which typically have a maximum outlet flow area of only about 0.078 square inches. Naturally, this increased flow area is an important feature in that it permits a higher volumetric flow rate through the valve, thus, returning the fluid system more quickly to its proper pressure level. This not only results in increased safety, but also provides an added measure of protection for other components and equipment in the system which may be otherwise damaged by a lengthy high pressure excursion of the fluid.

The nozzle member 10 also has a relatively small diameter pilot hole 18 formed axially therein communicating with the bore 12 at one end and with a pilot sealing area 20 at the other. Fluid under pressure flows through the pilot hole 18 to open the valve in a manner which will be explained more fully below.

A cylindrically shaped housing 22 having a hollow bore 24 encloses the nozzle member 10 and is threadly attached at its lower end to the valve body 4. A threaded lock nut 26 maintains tight securement between the housing and the valve body. A static, fluid-tight seal is provided in a ring-shaped body seal 28 of polymeric material to prevent the leakage of fluid between the housing 22 and the body 4. The seal 28 is secured to the valve body by a ring-shaped, retainer plate 30 which is held in place by threaded fasteners 32 spaced around the circumference thereof. The housing 22 is constructed of a high strength material such as stainless steel and is, thus, capable of safely handling the full inlet internal pressure of the valve 2. The top portion of the housing 22 preferably has a reduced diameter, threaded section 34 upon which is secured a cap 36. A ring-shaped, static sealing element 38 is fitted within a like shaped groove formed in the cap 36 to provide a fluid-tight seal between the cap and the housing 22. The upper portion of the housing 22 also has a reduced diameter, threaded bore 24' to threadably receive an adjustment bolt 39 therein, the purpose of which will be explained hereinafter.

A cylindrically shaped poppet member 40 is also included to provide a seal around the outlet orifices 16 when the relief valve 2 is in a closed or disactivated state. The poppet 40 has an axial bore 42 which receives the exposed end of nozzle member 10 of the valve body 4 therein. The poppet 40 slidably moves in an axial direction from a closed position shown in FIG. 1, to a fully open position depicted in FIG. 3. In order to insure a leak-proof fluid seal between the poppet 40 and the outlet orifices 16, when the poppet is in the closed position, a pair of ring-shaped, upper and lower static seals 44 and 465, respectively, are provided. The seals 44 and 46 are positioned on opposed, axially spaced-apart sides of the outlet orifices 16. The seals are secured to the outer surface of the nozzle member 10 by a two spacer sleeves 48 and 50. Sleeve 50 has four, 90° spaced-apart holes formed therein which respectively, mate with each of the four orifices 16 to permit the flow of fluid therethrough when the poppet 40 is in the open position. A sleeve-shaped, packing nut 52 threadably engages mating threads formed at the top of the nozzle member 10 to securely hold the seals 44 and 46, as well as the spacer sleeves 48 and 50, in place thereon. The seals 44 and 46 are of a trapazodial cross-sectional shape, with the more narrow side facing directly against bore 42 of the poppet 40. The trapazodial shaped provides an anti-exrusion seal, to prevent seal blow-out and shear as the poppet 40 opens and closes under high fluid pressure. Each of the seals 44 and 46 are molded from a polyamide material and may conveniently be formed in split pairs, that is, each seal being made-up of a pair of sealing elements wherein each element has a one-half trapazoidal cross-sectional shape.

A high compression spring element 54 bears against a shoulder 56 formed at the top of the poppet 40, at one end, and against an adjustment washer 58 at the other. The washer 58, in turn, bears against the lower end of the adjustment bolt 39 which determines the length of the spring 54 and, hence, influences the amount of compression or biasing force against the poppet 40. The compression in spring 54 is varied by raising or lowering the adjustment bolt 39 by rotating the bolt within the threaded bore 24' of the housing 22. After the proper length and spring compression is established, a lock nut 49 is tightened at the top of the bolt 39 to secure it within the bore 24'.

A cylindrically-shaped, pilot plunger 60 is slidably received within the bore 42 of the poppet 40. Plunger 60 includes a reduced diameter, shaft portion 62 which is received within a bore 64 formed at the top of the poppet. A bore 66 is also formed in the poppet 40, coaxial with and intermediate the bores 42 and 62, to receive a coil spring 68 therein. Spring 68 biases the pilot plunter 60 downwardly to a closed position shown in FIG. 1. A spherically-shaped, sealing ball 70 is press-fitted within a cavity formed at the end of the plunger 60 to close-off and seal the pilot hole 18 at the sealing area 20 thereof when the pilot plunger is in the closed postion. Sealing ball 70 is preferably formed of a resilient polymeric material such as polyamide or the like. A metal-to-metal seal may also be employed to seal the pilot hole 18, although, a polymeric material is preferred due to the resilient seating characteristics which is provides. The compression within plunger spring 68 is pre-set by proper spring selection and by final adjustment of nuts 72 which are threadably attached to the end of the plunger shaft 62. Pilot plunger 60 also carries a dynamic, ring-shaped seal 74 to prevent fluid leakage between the moving plunger 60 and the sidewall of the poppet bore 42. Seal 74 is also constructed of a polymeric material.

A vent hole 76 is formed transversley through one side of the poppet 40 to communicate with the poppet bore 42 in the open space between the pilot plunger 60 and the pilot sealing area 20 at one end of the vent hole 76 and to communicate with the bore 24 of the housing 22 at the other end. The vent hole 76 allows fluid in the open space beneath the pilot plunger 60 to evacuate therefrom, so as to permit the plunger 60 to quickly travel to the closed position. The annular gap formed between the housing bore 24 and the exterior of the poppet 40 also provides an expansion chamber for the fluid to flow therearound and upwardly to the open space occupied by spring 54.

The housing 22 also has an outlet orifice 78 formed therethrough which is adapted to communicate with the outlet orifices 16 of the nozzle member 10 when the poppet 40 is in the open position. The outlet orifice 78 is preferably counter-bored, having threads formed in the larger diameter portion to receive an externally threaded outlet adapter 80 therein. Adapter 80 has an axial bore 82 formed therethrough which is adapted to permit the passage of fluid therethrough when the relief valve 2 is open. The bore 82 also has threaded portion for the attachment of a take-away conduit or the like. A ring-shaped, sealing element 84 is also fitted in a recess at the inner face of the outlet adapter 80 to prevent fluid leakage between the housing 22 and the outlet adaptor.

Figure 2:
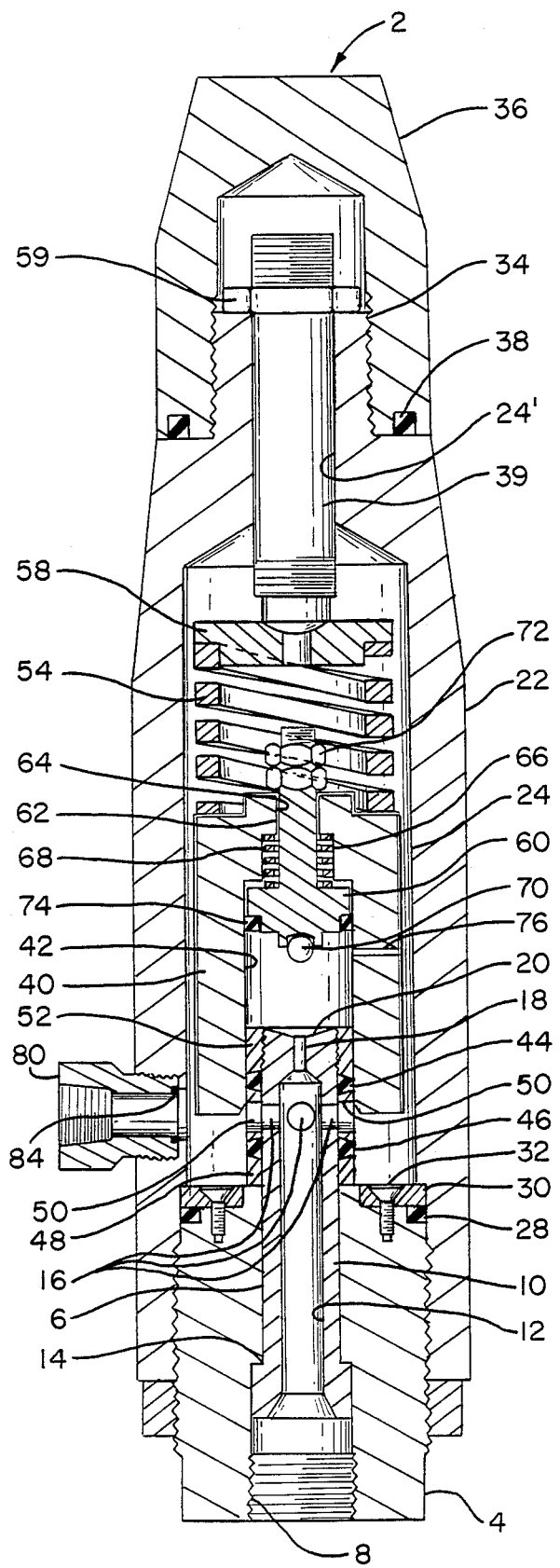
FIG. 2 is a sectional view similar to FIG. 1 showing the valve in a partially open position.
Figure 3:
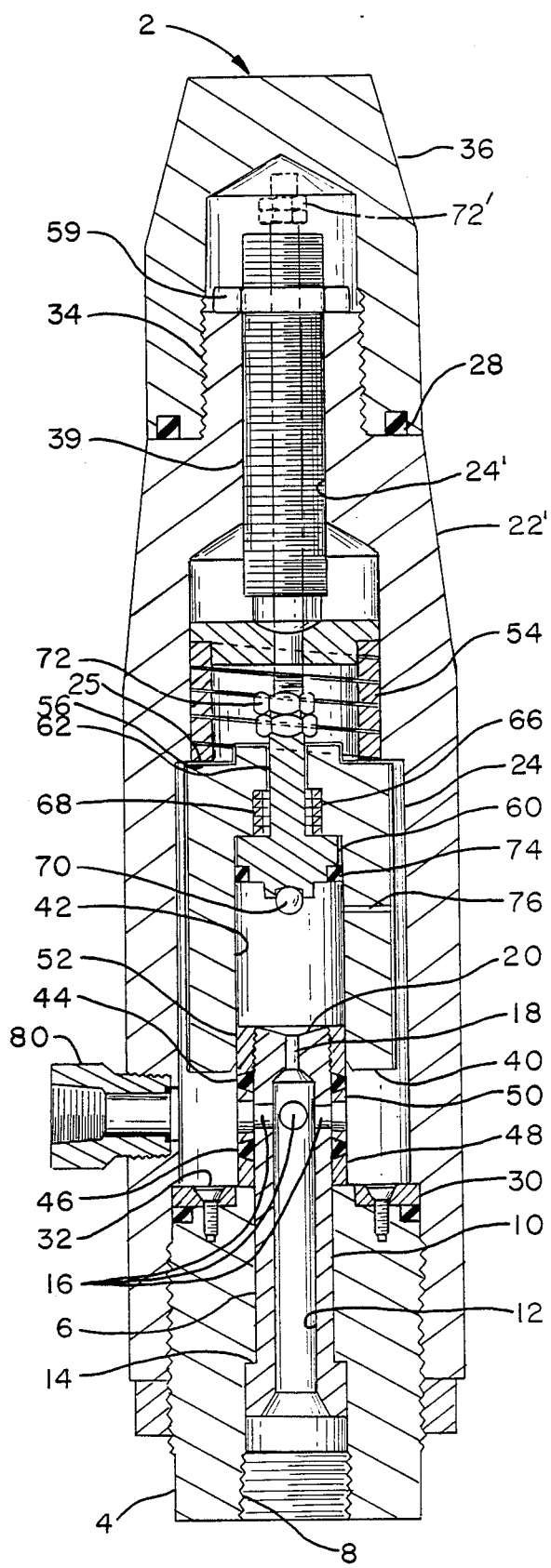
FIG. 3 is a sectional view similar to FIGS. 1 and 2 showing the valve in a fully open position.

In operation, the relief valve 2 is attached to a high pressure fluid system at inlet 8 and is normally in the closed position depicted in FIG. 1. As the system fluid pressure reaches and then slightly exceeds a predetermined, maximum level, the pressurized fluid causes the sealing ball 70 of the pilot plunger 60 to unseat from the pilot seating area 20 of the nozzle 10. This predetermined level is set by the compressive force of the plunger spring 68. Since the pilot hole 18 diameter is relatively small, the total force presented to the sealing area of ball 70 is also correspondingly small. Because of this, the plunger spring 68 is of moderate compression and very sensitive. At this cracking stage, high pressure fluid travels through the pilot hole 18 and rapidly moves the pilot plunger 60 upwardly to the intermediate position shown in FIG. 2, and then to the fully open position of FIG. 3. Due to the relatively large surface area presented by the face of the pilot plunger 60, and the correspondingly large hydraulic forces exerted thereon by the high pressure fluid system, the valve 2 fully opens in a matter of micro-seconds after pilot cracking. The plunger 60 moves upwardly, as shown in FIGS. 2 and 3, as it is being rapidly driven by the high pressure fluid and then comes to a stop against the poppet 40. Continued fluid pressure forces the plunger 60 to overcome the compressive biasing force of the poppet spring 54 and moves the poppet 40 to the open position. The bore 24 of the housing 22 preferably has a shoulder 25 formed therein, FIG. 3, to engage the upper surface 56 of the poppet 40 to stop the poppet when it reaches the open position. At this stage, the pressurized fluid is free to vent unrestricted from the system, flowing through the bore 12, to the nozzle orifices 16 and, thence, through the outlet bore 82 of the fitting 80. At some point, when the system pressure decreases to a level slightly below the pre-determined maximum value, the compressive force of poppet spring 54 becomes greater than the fluid force acting on the pilot plunger. At that time the poppet 40 and pilot plunger 60 sequentially close to the positions of FIG. 1. The closing sequence, likewise, occurs in a matter of micro seconds.

It is important to recognize that the pilot hole 18 is precisely controlled to a relatively small diameter, thus, permitting the use of a moderately sized pilot spring 68, even at extremely high fluid pressures of 25,000 psi, or greater. This feature provides for a more sensitive valve with minimum override. This sensitivity, coupled with the large surface area of pilot plunger 60, permits the valve 2 to fully open substantially simultaneously with the first cracking of the pilot plunger sealing ball 70.

The relief valve 2 of the present invention is also readily converted to a direct acting, manual or remote control valve when fitted with one of several lifting gear means, such as, a manual lever, or a hydraulic or air actuated lifting device (not shown). A manual type of lifting gear is shown in phantom lines in FIG. 1. In such an embodiment, the pilot plunger shaft has an extended shaft portion 62' which slidably passes through a bore 86 formed in the adjustment bolt 39 and through a bore 86' formed in the housing cap 36. A ring-shaped seal 94 is also provided to prevent fluid leakage between the bore 86' and the shaft 62'. The manual lifter includes a lift arm 88 which is pivotally secured by way of pin 87 to a web-like extension on the top of the cap 36. A lift handle 90 is affixed to the arm 88 whereby upward movement of the handle causes the member 88 to urge a washer 92 and lock nuts 89 in place on the shaft 62', upwardly. Washer 92 is preferably a spherical washer, having a convex surface in contact with the top of the cap 36 so as to more easily translate the rocking movement imported by the arm 88 into an upward force on the shaft 62'. Continued movement of shaft 62' causes the plunger 60 to move the poppet 40 to the open position. When the upward lifting force is removed from the shaft 62', the downward biasing force of the springs 54 and 66 moves the poppet 40 and the plunger 60 to their respective closed positions.

When the aforementioned lifting gear is employed, the adjustment nuts 72 are moved to the position occupied by nuts 89. In this configuration, compression in the pilot plunger spring 68 is varied to any pre-selected value by rotative movement of the nuts 89 which causes corresponding movement of the shafts 62' and 62 to cause compression or relaxation of the spring 68 within the confines of bore 68.

While not shown in the drawings, it can easily be understood by those skilled in the art that the manual lifting arrangement described above could be replaced by commercially available hydraulic or pneumatic lifting gear. In such a modification, the piston shaft of the hydraulic or pneumatic cylinder is attached to the top of th extended shaft 62' and imports a upward force thereon to open the popper 40 and permit the flow of fluid through the valve. When the lifter cylinder is de-activated, the springs 54 and 66 return the poppet 40 and pilot plunger, respectively to the closed positions. The hydraulic or pneumatic lifting systems are activated either manually or automatically, at the valve location or at a point remote therefrom. With the lifting gear in place, the valve 2 is, however, still free to operate as a pressure relief valve in the manner previously described, since the extended shaft 62' is free to move upwardly in response to system pressure excursions. The lifting gear, thus provides a means of system flow control at fluid pressure below the pre-set maximum.

A further preferred embodiment of the compression adjustment means for pilot plunger spring 68 is shown in phantom lines in FIG. 3. The adjustment nuts 72 are moved to the position occupied by nuts 72' within the confines of housing cap 36. In this configuration the plunger shaft 62 extends upwardly through a bore in bolt 39 in the same manner as previously described in the lifting gear modification. This embodiment provides faster adjustment of the spring compression since access to the nuts 72' is gained simply by removing cap 36.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A high pressure relief valve adapted to open at a predetermined fluid system pressure on the order of up to 25,000 p.s.i. and greater, said relief valve comprising:
   a valve body member having a central bore therethrough and an inlet end adapted to communicate with the fluid system, a nozzle member fixedly positioned within the bore of the valve body member, said nozzle member having an axial bore communicating with the bore of the valve body member, said nozzle member having at least one outlet orifice formed transversely therethrough communicating with the axial bore of said nozzle member, said nozzle member also having a pilot hole formed therethrough communicating with the axial bore and with a pilot seating area on the exterior surface of said nozzle member;
   a poppet member having an internal bore for slidably fitting around a portion of said exterior surface of said nozzle member for sealing said outlet orifice therein when the poppet member is in a closed position and for uncovering said outlet orifice when in an open position;
   poppet biasing means for compressively urging said poppet member in said closed position;
   a pilot plunger member slideably positioned within the internal bore of said poppet member carrying means for sealing off said pilot hole at the pilot sealing area when in a closed position; and
   plunger biasing means for compressively urging the plunger member in said closed position, said plunger biasing means having a pre-set compression value, which, when exceeded by a pressure excersion in said fluid system, is adapted to permit said plunger member to unseat from said pilot hole, whereupon said plunger is adapted to move away from the pilot seating area under the influence of said fluid pressure to a stopped position within said poppet bore, whereby said fluid pressure exerts a force on said stopped plunger and poppet causing said poppet to overcome the compressive force of said poppet biasing means, to move said poppet to the open position, whereby, an amount of the pressurized fluid is adapted to flow through the outlet orifice of said valve body member to the exterior thereof to relieve the pressure in the fluid system, and wherein the nozzle member is fixedly secured within the bore of the valve body member by an interference fit to create a pre-stressed condition therebetween, whereby, upon introduction of the pressurized fluid within said axial bore, hoop stresses caused by said pre-stressed conditions are eliminated at a transitional wall between said nozzle member and said valve body member.

2. The pressure relief valve of claim 1 including ring-shaped sealing means positioned on the exterior surface of said nozzle member on opposed, axially-spaced sides of said outlet orifice for sealing interaction between said nozzle member and the poppet member.

3. The pressure relief valve of claim 2 wherein the sealing means includes a pair of tapered, anti-extrusion seal rings, each of rings having a trapozoidial shaped cross-section, with a narrower side of said trapozoidial shaped facing said poppet member, said sealing means further including sleeve means for holding said seal rings in place on the exterior surface of said nozzle member.

4. The pressure relief valve of claim 1 including a housing member threadably secured to and surrounding said valve body member and surrounding said poppet member, in spaced relationship therefrom, said housing member having an outlet bore therein communicating with the outlet orifice of said nozzle member, said housing member adapted to form, in the space region surrounding said poppet member, an expansion chamber for the pressurized fluid.

5. The pressure relief valve of claim 4 wherein the poppet member has a vent hole formed therethrough communicating at a first end with the expansion chamber and with the internal bore of said poppet member at a second end in a region of said bore between the plunger member and the pilot seating area of the nozzle member.

6. The pressure relief valve of claim 4 which is adapted for use at a pre-determined fluid system pressure of between about 20,000 PSI to 30,000 PSI.

7. The pressure relief valve of claim 6 wherein the fluid is a liquid and the system pressure is about 25,000 PSI.

8. The pressure relief valve of claim 4 including lifting gear means associated with said housing member to permit the movement of said poppet to the open and closed positions at fluid pressure levels below said pre-determined fluid system pressure.

9. The pressure relief valve of claim 1 wherein the nozzle member is constructed of a corrosion and erosion resistant material is a stainless steel.

10. The pressure relief valve of claim 9 wherein the corrosion and erosion resistant material is a stainless steel.

11. The pressure relief valve of claim 1 wherein the nozzle member has four outlet orifices formed therein, spaced at 90° intervals around the periphery threof.

12. The pressure relief valve of claim 1, wherein the plunger member has a surface area substantially greater than the cross-sectional area of said pilot hole, whereby said plunger member is adapted to open said poppet member substantially instantaneously when said seating means is unseated from said pilot hole.

13. The pressure relief valve of claim 1 wherein the pilot hole sealing means carried by said plunger member is a spherically-shaped sealing ball.

14. The pressure relief valve of claim 13 wherein the plunger sealing ball is formed from a polyamide material.

* * * * *